United States Patent
Watanabe et al.

(10) Patent No.: US 11,984,811 B2
(45) Date of Patent: May 14, 2024

(54) POWER SUPPLY CONTROL DEVICE AND SWITCHING POWER SUPPLY APPARATUS

(71) Applicant: SEIKO EPSON CORPORATION, Tokyo (JP)

(72) Inventors: Shinichiro Watanabe, Chino (JP); Katsumi Inoue, Matsumoto (JP); Kanji Aoki, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 112 days.

(21) Appl. No.: 17/703,202

(22) Filed: Mar. 24, 2022

(65) Prior Publication Data

US 2022/0311346 A1 Sep. 29, 2022

(30) Foreign Application Priority Data

Mar. 26, 2021 (JP) ................................ 2021-054247

(51) Int. Cl.
*H02M 3/335* (2006.01)
*H02M 1/00* (2006.01)
*H02M 1/32* (2007.01)

(52) U.S. Cl.
CPC ..... *H02M 3/33569* (2013.01); *H02M 1/0006* (2021.05); *H02M 1/0032* (2021.05); *H02M 1/32* (2013.01); *H02M 3/33523* (2013.01)

(58) Field of Classification Search
CPC ............. H02M 3/335; H02M 3/33569; H02M 3/33523; H02M 1/0032; H02M 1/0006; H02M 1/32; H02M 1/08; H02M 3/33507; H02M 3/337; H02M 3/33538; H02H 7/1213

See application file for complete search history.

(56) References Cited

U.S. PATENT DOCUMENTS

| | | | | |
|---|---|---|---|---|
| 7,505,287 B1* | 3/2009 | Kesterson | ......... | H02M 3/33507 363/21.16 |
| 10,312,816 B1* | 6/2019 | Zhao | ..................... | H02M 3/156 |
| 2013/0021013 A1* | 1/2013 | Kondou | .................. | H02M 1/36 323/283 |

(Continued)

FOREIGN PATENT DOCUMENTS

JP 2007-215336 8/2007

*Primary Examiner* — Thienvu V Tran
*Assistant Examiner* — Shahzeb K Ahmad
(74) *Attorney, Agent, or Firm* — Rankin, Hill & Clark LLP (57) ABSTRACT

A power supply control device that controls a switching element of a switching power supply apparatus which includes a transformer having a primary winding, a secondary winding, and an auxiliary winding, the switching element coupled to the primary winding, and a capacitor coupled to the auxiliary winding, includes: a power supply terminal coupled to one end of the capacitor; a switch and a resistor coupled in series between the power supply terminal and a ground; a first control circuit that controls the switch; and a second control circuit that controls the switching element, in which the first control circuit performs control to turn on the switch when a first voltage applied to the power supply terminal continuously exceeds a first reference voltage for a first time, and the second control circuit performs control to turn off the switching element when the first voltage exceeds a second reference voltage higher than the first reference voltage.

4 Claims, 3 Drawing Sheets

(56) References Cited

U.S. PATENT DOCUMENTS

2018/0034373 A1\* 2/2018 Matsuda ................. H02M 1/32
2018/0342956 A1\* 11/2018 Djenguerian ..... H02M 3/33507
2020/0127555 A1\* 4/2020 Matsuda ........... H02M 3/33523

\* cited by examiner

POWER SUPPLY CONTROL DEVICE AND SWITCHING POWER SUPPLY APPARATUS

The present application is based on, and claims priority from JP Application Serial Number 2021-054247, filed Mar. 26, 2021, the disclosure of which is hereby incorporated by reference herein in its entirety.

BACKGROUND

1. Technical Field

The present disclosure relates to a power supply control device and a switching power supply apparatus.

2. Related Art

In the related art, a switching power supply apparatus, which outputs a voltage Vout by rectifying and smoothing a DC voltage obtained from an AC voltage by an AC power supply by switching on and off of a switching element, has been known. Further, it is generally known that on/off switching of a switching element is controlled by, for example, a power supply control device manufactured by an integrated circuit or the like.

A voltage Vcc of the power supply for driving such a power supply control device utilizes a voltage induced in auxiliary winding of a transformer by switching on and off of the switching element. In JP-A-2007-215336, a power supply control device is disclosed in which in a case where a load becomes heavier, the voltage Vcc gradually rises, and an overvoltage of the voltage Vcc is detected, a power supply terminal to which the voltage Vcc is applied and a ground which is a ground potential are coupled via a dummy resistor, and the voltage Vcc is dropped by allowing a current to flow through the dummy resistor.

The power supply control device disclosed in JP-A-2007-215336 allows a large current to flow through the dummy resistor as soon as the voltage Vcc reaches 23 V, thereby dropping the voltage Vcc. Therefore, even if the switching power supply apparatus fails, the voltage Vcc is unlikely to exceed an overvoltage protection voltage (25 V), and there is a risk that a function of turning off the switching element is not operated.

SUMMARY

One aspect of a power supply control device according to the present disclosure controls a switching element of a switching power supply apparatus which includes a transformer having a primary winding, a secondary winding, and an auxiliary winding, the switching element coupled to the primary winding, and a capacitor coupled to the auxiliary winding, and the power supply control device includes: a power supply terminal coupled to one end of the capacitor; a switch and a resistor coupled in series between the power supply terminal and a ground; a first control circuit that controls the switch; and a second control circuit that controls the switching element, in which the first control circuit performs control to turn on the switch when a first voltage applied to the power supply terminal continuously exceeds a first reference voltage for a first time, and the second control circuit performs control to turn off the switching element when the first voltage exceeds a second reference voltage higher than the first reference voltage.

DESCRIPTION OF EXEMPLARY EMBODIMENTS

Hereinafter, preferred embodiments of the present disclosure will be described with reference to the drawings. The drawings used are for convenience of explanation. The embodiments described below do not unreasonably limit the content of the present disclosure described in the claims. Moreover, not all of the configurations described below are essential constituent requirements of the present disclosure.

1. Configuration of Switching Power Supply Apparatus

Figure 1:
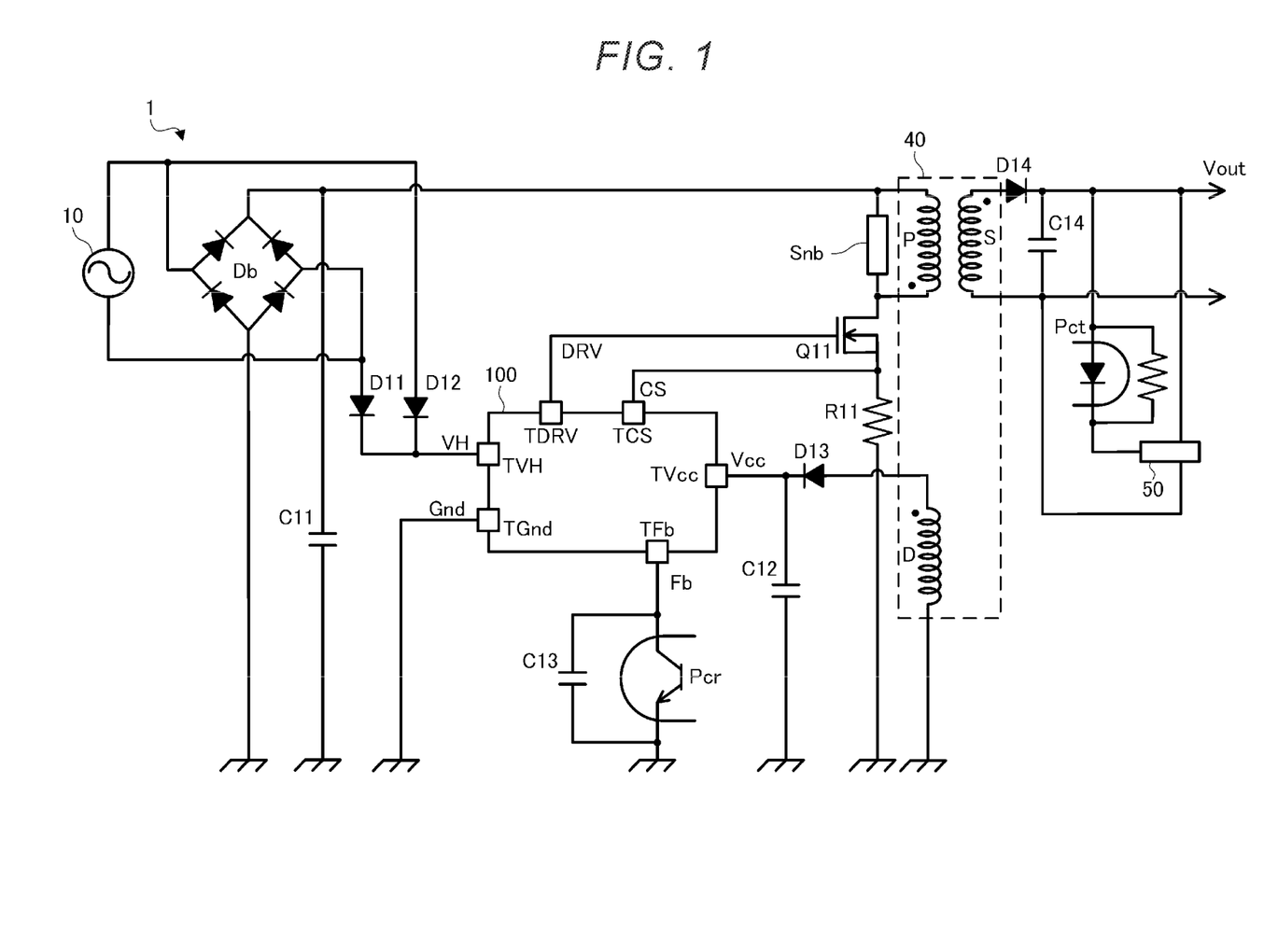
FIG. 1 is a diagram illustrating a schematic configuration of a switching power supply apparatus.

FIG. 1 is a configuration example of a switching power supply apparatus 1 including a power supply control device 100. The switching power supply apparatus 1 is a so-called flyback type ACDC converter. Specifically, the switching power supply apparatus 1 stores energy by allowing a current to flow through a primary winding P of a transformer 40 by turning on a switching element Q11. The switching power supply apparatus 1 outputs the energy stored in the primary winding P from a secondary winding S of the transformer 40 via a diode D14 by turning off the switching element Q11. The switching power supply apparatus 1 generates a DC voltage Vout by smoothing a voltage output from the diode D14 by a capacitor C14.

The switching power supply apparatus 1 includes an AC power supply 10, the transformer 40, an error amplifier 50, the power supply control device 100, a diode bridge db, the switching element Q11, capacitors C11, C12, C13, and C14, diodes D11, D12, D13, and D14, and a resistor R11.

The AC voltage from the AC power supply 10 is an AC input voltage of the switching power supply apparatus 1. The diode bridge db rectifies the AC voltage generated by the AC power supply 10. A positive terminal of the diode bridge db is coupled to one end of the primary winding P and one end of the capacitor C11 in the transformer 40, and a negative terminal of the diode bridge db and the other end of the capacitor C11 are coupled to a ground. For example, the ground is a ground potential. Further, the ground is coupled to a terminal TGnd of the power supply control device 100.

The transformer 40 has the secondary winding S and an auxiliary winding D in addition to the primary winding P. The other end of the primary winding P is coupled to a drain of the switching element Q11. The switching element Q11 is, for example, an N-channel metal oxide semiconductor field effect transistor (MOSFET), and a source is coupled to one end of the resistor R11. The other end of the resistor R11 is coupled to the ground. Therefore, the primary winding P and the switching element Q11 are coupled in series between the positive terminal and the negative terminal of the diode bridge db.

A snubber circuit Snb is provided between one end and the other end of the primary winding P in the transformer 40, and absorbs a transient voltage generated in the primary winding P when the switching element Q11 is switched on and off.

One end of the secondary winding S is coupled to an anode of the diode D14. The capacitor C14 is coupled between a cathode of the diode D14 and the other end of the secondary winding S. The voltage smoothed by the capacitor C14 is output as Vout. The diode D14 and the capacitor C14 rectify and smooth the voltage induced in the secondary winding S to generate Vout which is the DC output voltage of the switching power supply apparatus 1.

A light emitting diode Pct and a phototransistor Pcr form a photocoupler. An anode of the light emitting diode Pct is coupled to the cathode of the diode D14, and a cathode of the light emitting diode Pct is coupled to the error amplifier 50. The error amplifier 50 allows a current corresponding to a deviation between the voltage Vout and a reference voltage of the error amplifier 50 to flow through the light emitting diode Pct.

The anode of the diode D13 is coupled to one end of the auxiliary winding D of the transformer 40, and the cathode of the diode D13 is coupled to a terminal TVcc of the power supply control device 100 and one end of the capacitor C12. The other end of the auxiliary winding D and the other end of the capacitor C12 are coupled to the ground. The terminal TVcc is an example of a power supply terminal.

The voltage induced in the auxiliary winding D is rectified by the diode D13 and smoothed by the capacitor C12. The diode D13 and the capacitor C12 rectify and smooth the voltage induced in the auxiliary winding D to generate Vcc which is the voltage input to the terminal TVcc of the power supply control device 100. The generated voltage Vcc is the power supply voltage of the power supply control device 100, and is an example of a first voltage.

An emitter of the phototransistor Pcr is coupled to the ground, and a collector is coupled to a terminal TFb of the power supply control device 100. The capacitor C13 is coupled in parallel with the phototransistor Pcr. The phototransistor Pcr allows a collector current to flow according to an amount of light received from the light emitting diode Pct. That is, the larger the voltage Vout, the larger the amount of light emitted from the light emitting diode Pct is, and therefore the larger the collector current of the phototransistor Pcr is.

The power supply control device 100 is configured as, for example, an integrated circuit device. The terminal TFb is pulled up to its internal power supply voltage, and the collector current of the phototransistor Pcr flows therein to generate a voltage Fb of the terminal TFb. The voltage Fb changes according to the collector current of the phototransistor Pcr. That is, the voltage Fb is a voltage corresponding to the deviation of the voltage Vout.

The power supply control device 100 detects the voltage Fb and controls the switching element Q11 so that the deviation of the voltage Vout indicated by the voltage Fb becomes small. Specifically, the power supply control device 100 performs pulse width modulation (PWM) control such that the deviation of the voltage Vout becomes small based on a voltage CS applied to one end of the resistor R11 and input from a terminal TCS and the voltage Fb to generate a drive signal DRV. The drive signal DRV output from a terminal TDRV is supplied to the gate of the switching element Q11.

Although the switching element Q11 is separate from the power supply control device 100 in FIG. 1, it may be integrated in the power supply control device 100.

The diode D11 and the diode D12 perform full-wave rectification of the AC voltage by the AC power supply 10 to generate a full-wave rectified voltage VH. The full-wave rectified voltage VH is input to a terminal TVH of the power supply control device 100.

In a case where the capacitor C12 is not sufficiently charged, there is a risk that the voltage Vcc may become low and the power supply control device 100 is not operated normally. Therefore, the power supply control device 100 can control the charging of the capacitor 12 by the full-wave rectified voltage VH applied to the terminal TVH. For example, immediately after the power is turned on to the AC power supply 10, or in a case where the voltage induced in the auxiliary winding D is low, it is conceivable that the capacitor C12 is not sufficiently charged and the voltage Vcc may be low.

2. Configuration of Power Supply Control Device

Figure 2:
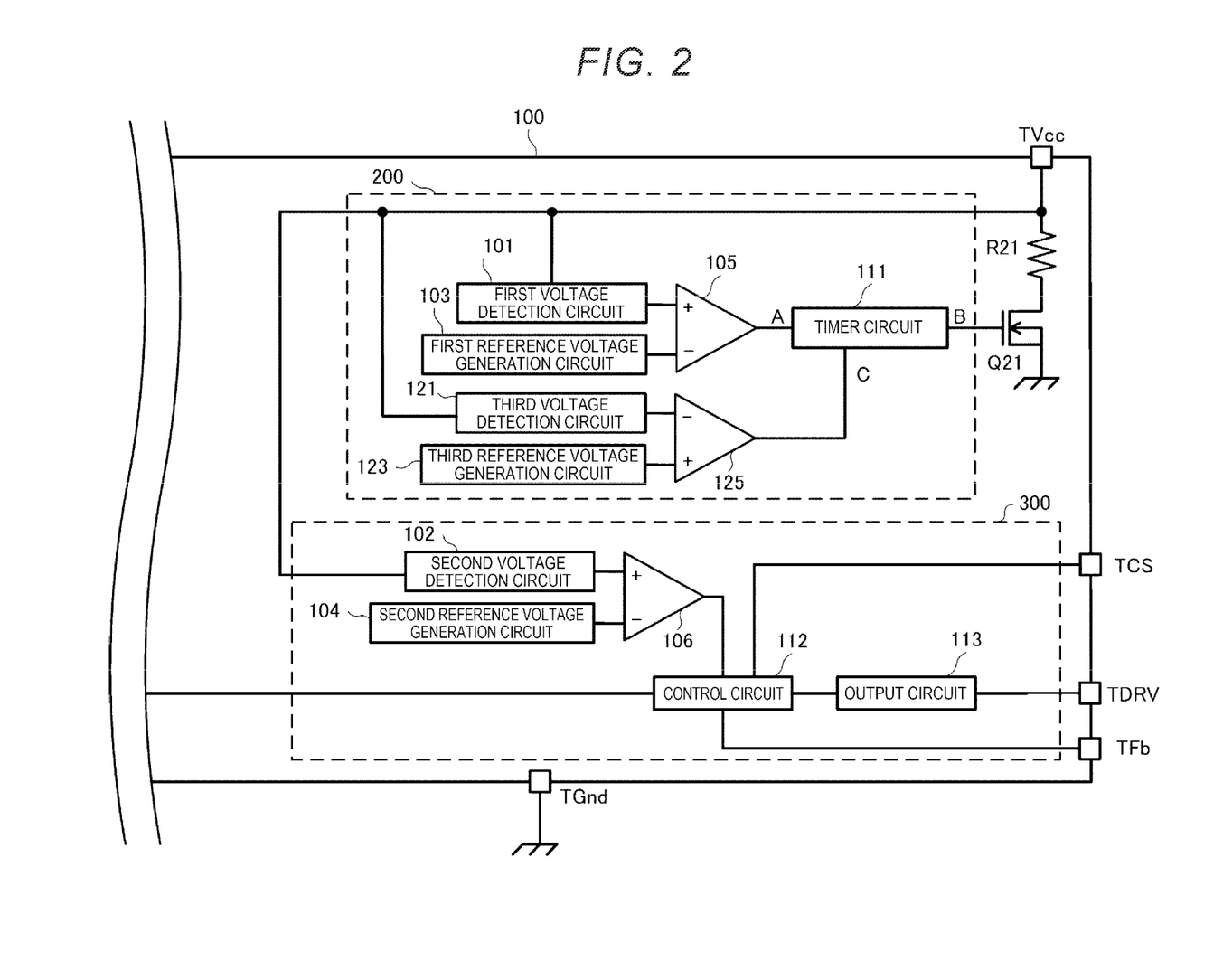
FIG. 2 is a diagram illustrating a schematic configuration of a power supply control device.

With reference to FIG. 2, an outline of the configurations related to the terminal TDRV, the terminal TVcc, the terminal TFb, the terminal TCS, and the terminal TGnd of the power supply control device 100 illustrated in FIG. 1 will be described.

The power supply control device 100 includes a first control circuit 200, a second control circuit 300, a switch Q21, and a resistor R21. The power supply terminal of the power supply control device 100 is the terminal TVcc, and the ground terminal is the terminal TGnd.

The first control circuit 200 includes a first voltage detection circuit 101, a first reference voltage generation circuit 103, a first comparator 105, a timer circuit 111, a third voltage detection circuit 121, a third reference voltage generation circuit 123, and a third comparator 125. The first control circuit 200 is a circuit that controls the switch Q21.

The first voltage detection circuit 101 is coupled to the terminal TVcc and detects the voltage Vcc which is the power supply voltage of the power supply control device 100. The detected voltage Vcc is input to a positive input terminal of the first comparator 105. On the other hand, a first reference voltage Vth1 generated by the first reference voltage generation circuit 103 is input to a negative input terminal of the first comparator 105. For example, the first reference voltage generation circuit 103 may be configured to generate the first reference voltage Vth1 by dividing the voltage VH input from the terminal TVH (not illustrated) by a plurality of resistors. Further, the first reference voltage generation circuit 103 may be configured to generate the first reference voltage Vth1 by stepping down the voltage VH with a step-down circuit.

The first comparator 105 outputs an L level signal to the timer circuit 111 in a case where Vcc<Vth1, and outputs an H level signal to the timer circuit 111 in a case where Vcc>Vth1. The signal input from the first comparator 105 to the timer circuit 111 is referred to as an input signal A. Further, the signal output from the timer circuit 111 to the switch Q21 is referred to as an output signal B.

The third voltage detection circuit 121 is coupled to the terminal TVcc and detects the voltage Vcc which is the power supply voltage of the power supply control device 100. The detected voltage Vcc is input to a negative input terminal of the third comparator 125. On the other hand, a third reference voltage Vth3 generated by the third reference voltage generation circuit 123 is input to a positive input terminal of the third comparator 125.

The third comparator 125 outputs an L level signal to the timer circuit 111 in a case where Vcc>Vth3, and outputs an H level signal to the timer circuit 111 in a case where Vcc<Vth3. The signal input from the third comparator 125 to the timer circuit 111 is referred to as an input signal C.

In a case where the input signal A is at the L level and the output signal B is at the L level, the switch Q21 is in the off state. On the other hand, in a case where the input signal A switches from the L level to the H level, when the input signal A is in the H level state continuously for a predetermined first time, the timer circuit 111 switches the output signal B from the L level to the H level, and the switch Q21 switches from off to on.

As will be described later, when the switch Q21 switches from off to on, the voltage Vcc drops. When the voltage Vcc drops and falls below the third reference voltage Vth3, the output signal of the third comparator 125 switches from the L level to the H level. That is, the input signal C of the timer circuit 111 switches from the L level to the H level, the timer circuit 111 switches the output signal B from the H level to the L level, and switches the switch Q21 from on to off.

For example, the timer circuit 111 may be configured such that a pulse signal having a constant period generated by an oscillator (not illustrated) is input and the first time can be set based on the pulse signal. In a case of such a configuration, for example, the timer circuit 111 can set the first time according to the number of input pulses.

The switch Q21 may be, for example, an N-channel MOSFET. The output signal B of the timer circuit 111 is input to the gate of the switch Q21. In a case where the output signal B is H level, the switch Q21 is turned on and the terminal TVcc is coupled to the ground via the resistor R21. In a case where the output signal B is L level, the switch Q21 is turned off and the terminal TVcc is not coupled to the ground.

The second control circuit 300 includes a second voltage detection circuit 102, a second reference voltage generation circuit 104, a second comparator 106, a control circuit 112, and an output circuit 113. The second control circuit 300 is a circuit that controls the switching element Q11.

The second voltage detection circuit 102 is coupled to the terminal TVcc and detects the voltage Vcc which is the power supply voltage of the power supply control device 100. The detected voltage Vcc is input to a positive input terminal of the second comparator 106. On the other hand, a second reference voltage Vth2 generated by the second reference voltage generation circuit 104 is input to a negative input terminal of the second comparator 106.

The second comparator 106 outputs the L level signal to the control circuit 112 in a case where Vcc<Vth2, and outputs the H level signal to the control circuit 112 in a case where Vcc>Vth2.

The control circuit 112 generates a control signal for controlling the switching element Q11 and outputs the control signal to the output circuit 113. In a case where the L level signal is input from the second comparator 106, the control circuit 112 generates a control signal for switching on and off the switching element Q11. The generated control signal is supplied to the switching element Q11 via the output circuit 113. The output circuit 113 functions, for example, as a buffer for adjusting the output timing of the control signal. In this case, energy is supplied to the transformer 40, and the switching power supply apparatus 1 outputs the voltage Vout.

Further, in the control circuit 112, the voltage CS applied to one end of the resistor R11 is input from the terminal TCS, and the voltage Fb that changes according to the collector current of the phototransistor Pcr is input from the terminal TFb. The phototransistor Pcr allows the collector current to flow according to the amount of light emitted from the light emitting diode Pct. The amount of light emitted from the light emitting diode Pct depends on the deviation between the voltage Vout and the reference voltage of the error amplifier 50.

Based on the voltage CS and the voltage Fb, the control circuit 112 performs PWM control such that the deviation of the voltage Vout becomes small, and generates the drive signal DRV. The drive signal DRV output from the terminal TDRV is supplied to the switching element Q11.

On the other hand, the control circuit 112 generates a control signal for turning off the switching element Q11 in a case where the H level signal is input from the second comparator 106. The generated control signal is supplied to the switching element Q11 via the output circuit 113. In this case, the supply of energy to the transformer 40 is stopped, and the switching power supply apparatus 1 is stopped. Therefore, the voltage Vout drops, and the voltage Vcc also drops accordingly.

3. Switch Control By First Control Circuit

The control by the first control circuit 200 will be described with reference to FIGS. 2 and 3. The voltage Vcc continues to rise slowly after the power of the switching power supply apparatus 1 is turned on. The first voltage detection circuit 101 detects the voltage Vcc input from the terminal TVcc, and the voltage Vcc detected by the first voltage detection circuit 101 is compared by the first comparator 105 with the first reference voltage Vth1 generated by the first reference voltage generation circuit 103.

Similarly, the third voltage detection circuit 121 detects the voltage Vcc input from the terminal TVcc, and the voltage Vcc detected by the third voltage detection circuit 121 is compared by the third comparator 125 with the third reference voltage Vth3 generated by the third reference voltage generation circuit 123. The voltage Vcc detected by the first voltage detection circuit 101 and the third voltage detection circuit 121 is an example of the first voltage.

In a case where Vcc<Vth1, that is, in a case where the voltage Vcc is lower than the first reference voltage Vth1, when the output of the first comparator 105 is at the L level, and the output signal B of the timer circuit 111 is also at the L level, the switch Q21 is turned off. That is, the first control circuit 200 does not perform control of the voltage Vcc, and the voltage Vcc does not change.

In a case where the state of Vcc>Vth1 continues for the first time, that is, in a case where the voltage Vcc continues for the first time and exceeds the first reference voltage Vth1, the first control circuit 200 performs control to drop the voltage Vcc. In this case, since the output signal of the first comparator 105, that is, the input signal A of the timer circuit 111 continues at the H level for the first time, the output signal B switches from the L level to the H level. Therefore, the switch Q21 switches from off to on.

Since the switch Q21 is on, the terminal TVcc and the ground are coupled via the resistor R21. Therefore, a current flows through the resistor R21 from the terminal TVcc toward the ground. Since the voltage drop occurs in the resistor R21, the voltage Vcc drops. The switch Q21 is an example of a switch, and the resistor R21 is an example of a resistor.

In a case where the voltage Vcc drops and falls below the third reference voltage Vth3, that is, in a case where Vcc<Vth3, the output signal of the third comparator 125, that is, the input signal C of the timer circuit 111 switches from the L level to the H level. Along with this, the output signal B of the timer circuit 111 switches from the H level to the L level. Therefore, the switch Q21 switches from on to off, and no current flows through the resistor R21. Since no current flows through the resistor R21, no voltage drop occurs in the resistor R21, and the control for dropping the voltage Vcc by the first control is stopped.

After the control for dropping the voltage Vcc by the first control is stopped, the voltage Vcc continues to rise gradually. In a case where the voltage Vcc rises and a state of exceeding the first reference voltage Vth1 continues for the first time, the control of dropping the voltage Vcc by the above-mentioned first control circuit 200 is performed again, and when the voltage Vcc falls below the third reference voltage Vth3, the control for dropping the voltage Vcc by the first control circuit 200 stops. The voltage Vcc is controlled by the first control circuit 200 so as to be between the third reference voltage Vth3 and the first reference voltage Vth1. For example, the first reference voltage Vth1 is 48 V and the third reference voltage is 45 V.

Figure 3:
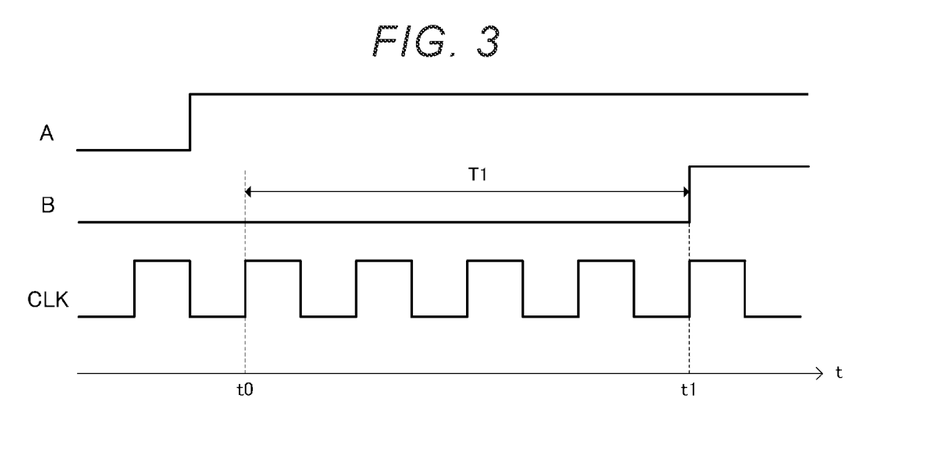
FIG. 3 is a diagram illustrating an example of a first time.

FIG. 3 is a diagram illustrating an example of the first time. A horizontal axis illustrates time. As illustrated in the drawing, the time from time t0 to time t1 is defined as the first time T1. A CLK signal is illustrated as an example of the reference signal. The input signal A is an input signal of the timer circuit 111, and is at the L level in a case where Vcc<Vth1 and is at the H level in a case where Vcc>Vth1.

In a case where the voltage Vcc rises and exceeds the first reference voltage Vth1, that is, in a case where Vcc>Vth1, the output of the first comparator 105, that is, the input signal A of the timer circuit 111 switches from the L level to the H level. The time at which the CLK signal first rises after the switching of the input signal A is set to t0. If the input signal A is continuously at the H level from the time t0 to the time t1, the output signal B of the timer circuit 111 switches from the L level to the H level. When the output signal B switches to the H level, the switch Q21 switches from off to on.

For example, as illustrated in FIG. 3, in a case where the first time T1 is the time from the time t0 to the time t1, the first time T1 is a time corresponding to four cycles of the CLK signal. For example, in a case where the frequency of the CLK signal is 1 kHz, the first time is 4 milliseconds. The first time T1 can be changed to a time corresponding to an arbitrary number of cycles of the CLK signal, and the first time T1 can be set to an arbitrary time by changing the frequency of the CLK signal.

As described above, the first control circuit 200 of the present embodiment performs control to turn on the switch Q21 when the voltage Vcc continuously exceeds the first reference voltage Vth1 for the first time. Therefore, the voltage Vcc can be dropped while suppressing, for example, the influence of the pseudo overvoltage for a very short time such as noise. On the other hand, when the voltage Vcc falls below the third reference voltage Vth3, the first control circuit 200 performs control to turn off the switch Q21 and stops the control to drop the voltage Vcc. Therefore, for example, the risk of dropping the voltage Vcc until the power supply control device 100 is not operated is reduced. Further, the first time can be arbitrarily set, and for example, the first time can be set according to the environment in which the switching power supply apparatus 1 is used.

4. Control of Switching Element By Second Control Circuit

Returning to FIG. 2, control by the second control circuit 300 will be described. In a case where the voltage Vcc exceeds the second reference voltage Vth2 which is higher than the first reference voltage Vth1, the second control circuit 300 performs control to turn off the switching element Q11. For example, the first reference voltage Vth1 is 48 V and the second reference voltage is 49 V.

The second control circuit 300 detects the voltage Vcc input from the terminal TVcc by the second voltage detection circuit 102. The detected voltage Vcc is compared by the second comparator 106 with the second reference voltage Vth2 generated by the second reference voltage generation circuit 104. Here, the voltage Vcc detected by the second voltage detection circuit 102 is an example of the first voltage.

In a case where Vcc<Vth2, that is, in a case where the voltage Vcc is lower than the second reference voltage Vth2, the second control circuit 300 does not perform control to turn off the switching element Q11. In this case, the second comparator 106 outputs an L level signal to the control circuit 112. In this case, as described above, the control circuit 112 performs PWM control so that the deviation of the voltage Vout becomes small based on the voltage CS input from the terminal TCS and the voltage Fb input from the terminal TFb, and generates the drive signal DRV. The drive signal DRV is supplied to the switching element Q11, and the switching power supply apparatus 1 outputs the voltage Vout.

The second control circuit 300 may perform control to turn off the switching element Q11 in a case where the state of Vcc>Vth2 continues for the second time, that is, in a case where the voltage Vcc continuously exceeds the second reference voltage Vth2 for the second time. In this case, the second comparator 106 outputs the H level signal to the control circuit 112. If the output signal of the second comparator 106 is continuously at the H level for the second time, the control circuit 112 generates the control signal to turn off the switching element Q11 regardless of the voltage CS input from the terminal TCS or the voltage Fb input from the terminal TFb. The generated control signal is supplied to the switching element Q11 via the output circuit 113, and the switching element Q11 is turned off.

When the switching element Q11 is turned off, the supply of energy to the transformer 40 is stopped, and the switching power supply apparatus 1 is stopped. Therefore, the voltage Vout drops, and the voltage Vcc also drops accordingly. The second time is a time that can be set by providing a buffer or the like in the control circuit 112.

As described above, the second control circuit 300 of the present embodiment performs control to turn off the switching element Q11. For example, in a case where the voltage Vcc rises sharply due to a failure of the switching power supply apparatus 1 or the like, and the voltage Vcc exceeds the second reference voltage Vth2 within the first time after exceeding the first reference voltage Vth1, the control of the switch Q21 is not performed by the first control circuit 200, but the second control circuit 300 performs control to turn off the switching element Q11. Since the second control circuit 300 performs control to turn off the switching element Q11, the voltage Vout and the voltage Vcc can be dropped. Therefore, for example, a risk that a device (not illustrated) or the power supply control device 100 to which the voltage Vout is supplied fails due to a failure of the switching power supply apparatus 1 is reduced.

Further, the second control circuit 300 of the present embodiment performs control to turn off the switching element Q11 when the voltage Vcc continuously exceeds the second reference voltage Vth2 for the second time. Therefore, the voltage Vout and the voltage Vcc can be dropped while suppressing, for example, the influence of the pseudo overvoltage for a very short time such as noise. Further, the second time can be arbitrarily set, and for example, the second time can be set according to the environment in which the switching power supply apparatus 1 is used.

The second time is shorter than the first time, in other words, the first time is preferably longer than the second time. For example, the first time may be about 4 milliseconds, and the second time may be about several tens of microseconds. In this case, in a case where the voltage Vcc rises sharply due to a failure of the switching power supply apparatus 1 or the like, the second time elapses before the first time in which the switch Q21 is in the off state elapses, and the voltage Vcc exceeds the second reference voltage Vth2. Therefore, the second control circuit 300 can reliably perform control to turn off the switching element Q11.

5. Time-Series Change of Voltage Vcc

Figure 4:
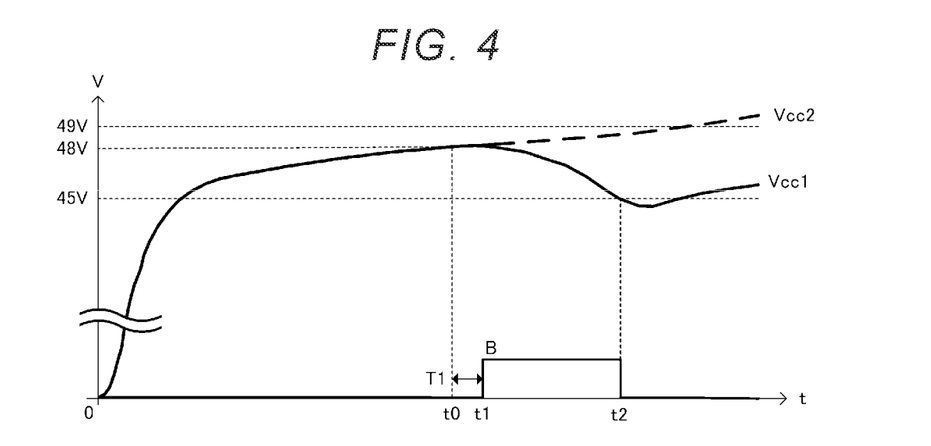
FIG. 4 is a diagram illustrating an example of time-series changes in a voltage Vcc.

FIG. 4 is a diagram illustrating an example of control of the voltage Vcc. A vertical axis illustrates voltage and a horizontal axis illustrates time. The time when the switching power supply apparatus 1 starts is set to 0. The first comparative example Vcc1 illustrates an example of the time-series change of the voltage Vcc in the power supply control device 100 of the present embodiment, and the second comparative example Vcc2 is an example of the time-series change of the voltage Vcc in the power supply control device of the related art. 48 V is an example for the first reference voltage Vth1, 49 V is an example for the second reference voltage Vth2, and 45 V is an example for the third reference voltage Vth3.

As illustrated in FIG. 4, from time 0 to time t1, the first comparative example Vcc1 and the second comparative example Vcc2 continue to rise from 0 V. Specifically, both the first comparative example Vcc1 and the second comparative example Vcc2 exceed 48 V at time t0 and continue to gradually rise until time t1. The second comparative example Vcc2 continues to rise gradually even after the time t1 and exceeds 49 V. That is, in the power supply control device of the related art, the voltage Vcc continues to rise and exceeds the second reference voltage Vth2.

On the other hand, since the first comparative example Vcc1 continues to exceed 48 V between the time t0 and the time t1, that is, during the first time T1, the first control circuit 200 performs control to turn on the switch Q21. Specifically, the input signal A from the first comparator 105 to the timer circuit 111 switches from the L level to the H level at time t0, and the output signal B of the timer circuit 111 switches from the L level to the H level at the time t1 after the lapse of the first time T1.

At time t1, the switch Q21 is turned on and a current flows through the resistor R21, so that the first comparative example Vcc1 begins to drop. The first comparative example Vcc1 continues to drop and falls below 45 V at the time t2. At the time t2, the input signal C from the third comparator 125 to the timer circuit 111 switches from the L level to the H level, the timer circuit 111 switches the output signal B from the H level to the L level, and switches the switch Q21 from on to off.

At time t2, the switch Q21 switches from on to off, no current flows through the resistor R21, and the first comparative example Vcc1 gradually rises again. In this way, the first comparative example Vcc1 is controlled so as to be approximately between 45 V and 48 V. That is, the power supply control device 100 of the present embodiment controls the voltage Vcc so as to be between the third reference voltage Vth3 and the first reference voltage Vth1.

The third reference voltage Vth3 is preferably 90% or more of the second reference voltage Vth2. In this case, a difference between the second reference voltage Vth2 and the third reference voltage Vth3 is small, and the voltage Vcc does not need to drop to a voltage lower than the third reference voltage Vth3, so that the resistance value of the resistor R21 can be set large. As a result, the current flowing through the resistor R21 from the terminal TVcc to the ground becomes small. Therefore, if the voltage Vout starts to rise due to a failure of the switching power supply apparatus 1 or the like when the switch Q21 is in the on state, since the current flowing through the resistor R21 from the terminal TVcc to the ground is small, the voltage Vcc rises until exceeding the second reference voltage Vth2. Therefore, in a case where the voltage Vout starts to rise, the switching element Q11 is surely turned off by the second control circuit 300, and the voltage Vout and the voltage Vcc can be dropped. Further, since the current flowing through the resistor R21 is small when the switch Q21 is in the on state, the power consumption of the first control circuit 200 can be suppressed.

6. Operation Effects

As described above, the power supply control device 100 in the present embodiment includes the first control circuit 200, and the first control circuit 200 performs control to turn on the switch Q21 when the voltage Vcc continuously exceeds the first reference voltage Vth1 for the first time. Therefore, the voltage Vcc can be dropped while suppressing, for example, the influence of the pseudo overvoltage for a very short time such as noise. On the other hand, when the voltage Vcc falls below the third reference voltage Vth3, the first control circuit 200 performs control to turn off the switch Q21 and stops the control to drop the voltage Vcc. Therefore, for example, the risk of dropping the voltage Vcc until the power supply control device 100 is not operated is reduced. Further, the first time can be arbitrarily set, and for example, the first time can be set according to the environment in which the switching power supply apparatus 1 is used.

Further, the power supply control device 100 in the present embodiment includes the second control circuit 300, and the second control circuit 300 performs control to turn off the switching element Q11. For example, in a case where the voltage Vcc rises sharply due to a failure of the switching power supply apparatus 1 or the like, the voltage Vcc exceeds the second reference voltage Vth2 within the first time after the first reference voltage Vth1 is exceeded. Therefore, before the first control circuit 200 performs control to turn on the switch Q21, the second control circuit 300 performs control to turn off the switching element Q11. Therefore, the voltage Vout and the voltage Vcc can be dropped, so that it is possible to avoid a situation in which an overvoltage state occurs for a long time.

Further, the second control circuit 300 of the present embodiment performs control to turn off the switching element Q11 when the voltage Vcc continuously exceeds the second reference voltage Vth2 for the second time. Therefore, the voltage Vout and the voltage Vcc can be dropped while suppressing, for example, the influence of the pseudo overvoltage for a very short time such as noise. Further, the second time can be arbitrarily set, and for example, the second time can be set according to the environment in which the switching power supply apparatus 1 is used.

Although the embodiments and modified examples have been described above, the present disclosure is not limited to these embodiments, and can be implemented in various embodiments without departing from the gist thereof. For example, the above embodiments can be combined as appropriate.

The present disclosure includes substantially the same configurations (for example, configurations with the same function, method, and result, or configurations with the same purpose and effect) as those described in the embodiments. The present disclosure also includes a configuration in which a non-essential portion of the configuration described in the embodiments is replaced. Further, the present disclosure includes a configuration having the same operation and effect as those in the configuration described in the embodiments or a configuration capable of achieving the same object. Further, the present disclosure includes a configuration in which a known technique is added to the configuration described in the embodiments.

The following contents are derived from the above-described embodiments and modified examples.

One aspect of the power supply control device that controls the switching element of a switching power supply apparatus which includes a transformer having a primary winding, a secondary winding, and an auxiliary winding, the switching element coupled to the primary winding, and a capacitor coupled to the auxiliary winding, the power supply control device includes a power supply terminal coupled to one end of the capacitor; a switch and a resistor coupled in series between the power supply terminal and a ground; a first control circuit that controls the switch; and a second control circuit that controls the switching element, in which the first control circuit performs control to turn on the switch when a first voltage applied to the power supply terminal continuously exceeds a first reference voltage for a first time, and the second control circuit performs control to turn off the switching element when the first voltage exceeds a second reference voltage higher than the first reference voltage.

According to this power supply control device, the first control circuit performs control to drop the first voltage in a case where the first voltage continuously exceeds the first reference voltage for the first time. Therefore, the first voltage can be dropped while suppressing, for example, the influence of the pseudo overvoltage for a very short time such as noise. Further, in a case where the first voltage rises sharply due to a failure of the switching power supply apparatus or the like, the first voltage exceeds the second reference voltage higher than the first reference voltage within the first time in which the switch is in the off state. Therefore, the second control circuit can reliably perform control to turn off the switching element.

One aspect of the power supply control device, in which the first control circuit may perform control to turn off the switch when the first voltage falls below a third reference voltage lower than the first reference voltage.

According to this power supply control device, when the first voltage falls below the third reference voltage, the first control circuit stops the control of dropping the first voltage, so that there is no risk that the power supply control device does not operate due to the first voltage dropping too much.

One aspect of the power supply control device, in which the third reference voltage may be 90% or more of the second reference voltage.

According to this power supply control device, in a case where the first voltage falls below the third reference voltage when the switch is in the on state, the switch is turned off. That is, since it is not necessary to drop the first voltage below the third reference voltage, the resistance value of the resistor can be increased to some extent to reduce the current flowing through the resistor from the power supply terminal to the ground. Therefore, in a case where the output voltage starts to rise based on the energy stored in the secondary winding of the transformer due to a failure of the switching power supply apparatus or the like when the switch is in the on state, since the current flowing through the resistor from the power supply terminal to the ground is small, the first voltage rises until exceeding the second reference voltage. Therefore, in a case where the output voltage of the switching power supply apparatus starts to rise, the switching element can be surely turned off by the second control circuit.

Further, according to this power supply control device, since the current flowing through the resistor is small when the switch is in the on state, the power consumption can be suppressed.

One aspect of the power supply control device, in which the second control circuit may perform control to turn off the switching element when the first voltage continuously exceeds the second reference voltage for the second time.

According to this power supply control device, by providing the second time, it is possible to drop the first voltage while suppressing, for example, the influence of the pseudo overvoltage for a very short time such as noise.

One aspect of the power supply control device, in which the first time may be longer than the second time.

According to this power supply control device, in a case where the first voltage rises sharply due to a failure of the switching power supply apparatus or the like, the second time elapses before the first time in which the switch is in the off state elapses, and the first voltage exceeds the second reference voltage. Therefore, the second control circuit can reliably perform control to turn off the switching element.

One aspect of the switching power supply apparatus includes one aspect of the power supply control device, the transformer, the switching element, and the capacitor.

According to this switching power supply apparatus, the first control circuit performs control to drop the first voltage in a case where the first voltage continuously exceeds the first reference voltage for the first time. Therefore, it is possible to drop the first voltage while suppressing, for example, the influence of the pseudo overvoltage for a very short time such as noise. Further, in a case where the first voltage rises sharply due to a failure of the switching power supply apparatus or the like, the first voltage exceeds the second reference voltage higher than the first reference voltage within the first time in which the switch is in the off state. Therefore, the second control circuit can reliably perform control to turn off the switching element.

What is claimed is:

1. A power supply control device that controls a switching element of a switching power supply apparatus which includes
    a transformer having a primary winding, a secondary winding, and an auxiliary winding,
    the switching element coupled to the primary winding, and
    a capacitor coupled to the auxiliary winding, the power supply control device comprising:
    a power supply terminal coupled to one end of the capacitor;
    a switch and a resistor coupled in series between the power supply terminal and a ground;
    a first control circuit that controls the switch; and
    a second control circuit that controls the switching element,
    wherein
    the first control circuit performs control to turn on the switch when a first voltage applied to the power supply terminal continuously exceeds a first reference voltage for a first time,
    the second control circuit performs control to turn off the switching element when the first voltage exceeds a second reference voltage higher than the first reference voltage,
    the second control circuit performs control to turn off the switching element when the first voltage continuously exceeds the second reference voltage for a second time, and
    the first time is longer than the second time.

2. The power supply control device according to claim 1, wherein
    the first control circuit performs control to turn off the switch when the first voltage falls below a third reference voltage lower than the first reference voltage.

3. The power supply control device according to claim 2, wherein
the third reference voltage is 90% or more of the second reference voltage.

4. A switching power supply apparatus comprising:
a transformer having a primary winding, a secondary winding, and an auxiliary winding;
a switching element coupled to the primary winding;
a capacitor coupled to the auxiliary winding; and
a power supply control device that controls the switching element,
wherein the power supply control device comprises:
a power supply terminal coupled to one end of the capacitor;
a switch and a resistor coupled in series between the power supply terminal and a ground;
a first control circuit that controls the switch; and
a second control circuit that controls the switching element,
wherein
the first control circuit performs control to turn on the switch when a first voltage applied to the power supply terminal continuously exceeds a first reference voltage for a first time,
the second control circuit performs control to turn off the switching element when the first voltage exceeds a second reference voltage higher than the first reference voltage,
the second control circuit performs control to turn off the switching element when the first voltage continuously exceeds the second reference voltage for a second time, and
the first time is longer than the second time.

* * * * *